United States Patent
Lewbel et al.

(10) Patent No.: US 8,434,685 B1
(45) Date of Patent: May 7, 2013

(54) ACCESSORY DEVICES CONFIGURED TO DISPLAY SUPPLEMENTAL CONTENT

(75) Inventors: Hannah Rebecca Lewbel, Campbell, CA (US); James Samuel Bowen, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 274 days.

(21) Appl. No.: 12/881,617

(22) Filed: Sep. 14, 2010

(51) Int. Cl.
*G06K 7/10* (2006.01)

(52) U.S. Cl.
USPC ......... 235/454; 362/154; 248/229.2; 359/296

(58) Field of Classification Search .................. 235/454; 362/154; 248/229.2; 359/296
See application file for complete search history.

(56) References Cited

U.S. PATENT DOCUMENTS

| | | | |
|---|---|---|---|
| 2007/0002024 A1* | 1/2007 | Goszyk | 345/168 |
| 2007/0026371 A1* | 2/2007 | Wood | 434/317 |
| 2007/0058944 A1* | 3/2007 | Millar | 386/96 |
| 2007/0258335 A1* | 11/2007 | Farinella et al. | 368/107 |
| 2008/0298083 A1* | 12/2008 | Watson et al. | 362/603 |
| 2010/0181450 A1* | 7/2010 | Hulick et al. | 248/229.2 |
| 2011/0220008 A1* | 9/2011 | Kamiya | 116/237 |

* cited by examiner

*Primary Examiner* — Allyson Trail
(74) *Attorney, Agent, or Firm* — Lee & Hayes, PLLC

(57) ABSTRACT

Described herein are accessory devices that are configured to both perform accessory functions for electronic devices, as well as output content that is supplemental or complementary to content being output by the electronic devices. The accessory functionality of the accessory devices may be far-ranging and may include reading lights, covers, projectors, universal serial bus (USB) drives, cameras, page-turn buttons, audio jacks, expansion headers, Bluetooth devices, biometric sensors, ambient light sensors, and more. These accessory devices may complement the operation of any number of electronic devices. For instance, an accessory device may both comprise a reading light to illuminate a display of an electronic book (eBook) reader device, as well as a display to display content that has been deemed supplemental to the content being displayed by the eBook reader device.

27 Claims, 5 Drawing Sheets

ACCESSORY DEVICES CONFIGURED TO DISPLAY SUPPLEMENTAL CONTENT

BACKGROUND

A large and growing population of users is enjoying entertainment through the consumption of digital content items (or simply "content items"), such as music, movies, images, electronic books, and so on. The users employ various electronic devices to consume such content items. Among these electronic devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
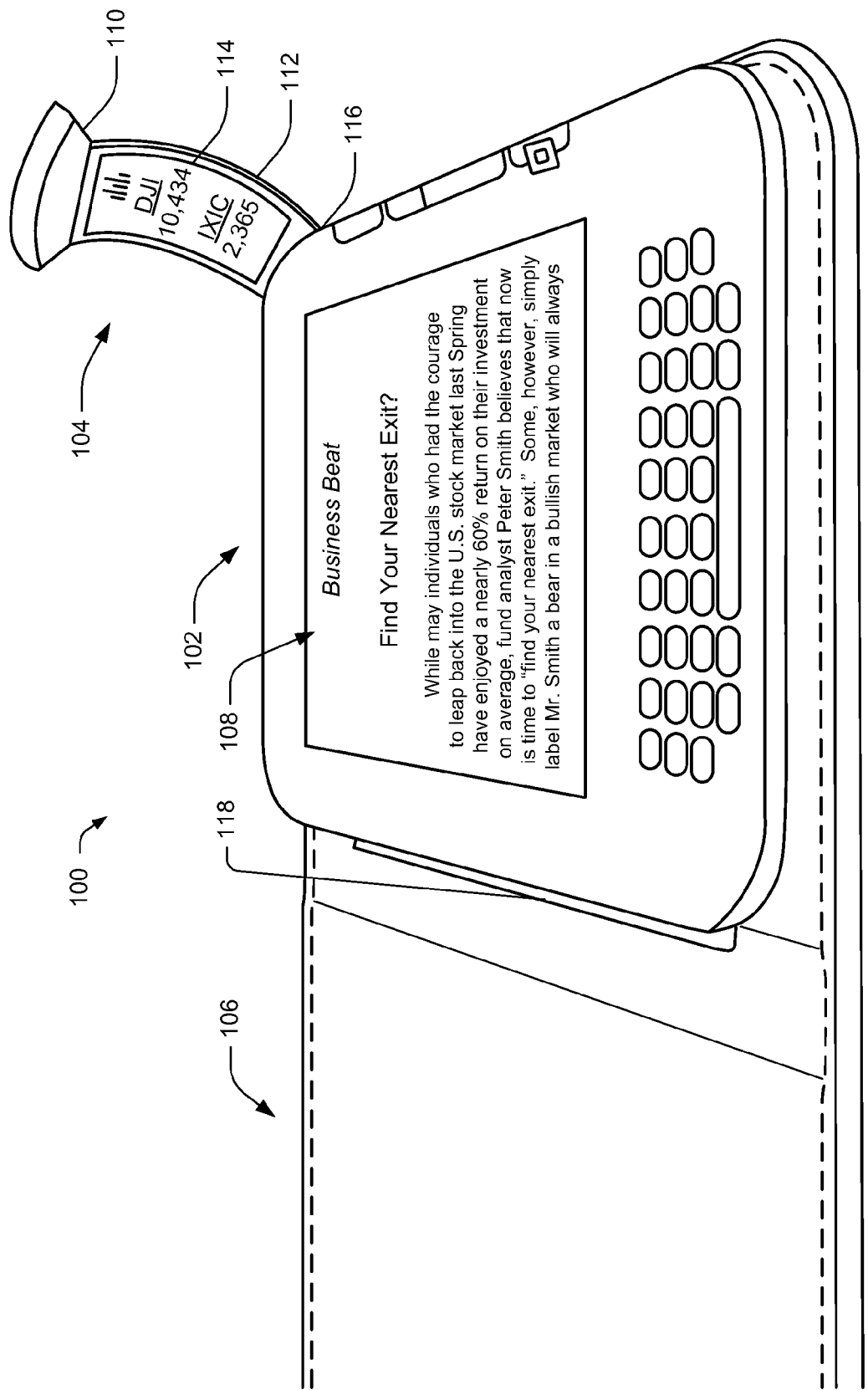
FIG. 1 shows a perspective view of an electronic book ("eBook") reader device and a reading light that is configured to both illuminate a display of the eBook reader device and display content that is supplemental to content that the eBook reader device displays.

This disclosure is directed to accessory devices that are configured to both perform accessory functions for electronic devices, as well as output content that is supplemental or complementary to content being output by the electronic devices. The accessory functionality of the accessory devices (or simply "accessories") may be far-ranging and may include reading lights, covers, projectors, universal serial bus (USB) drives, cameras, page-turn buttons, audio jacks, expansion headers, Bluetooth devices, biometric sensors, ambient light sensors, and more, as discussed in detail below. These accessory devices may complement the operation of any number of electronic devices, including electronic book (eBook) reader devices, tablet computers, laptop computers, netbooks, notebooks, desktop computers, mobile or cellular telephones, personal digital assistants (PDAs), multi-functional communication devices, or any other mobile or stationary electronic devices.

In addition to performing accessory functions for electronic devices, these accessory devices may identify content that is supplemental to content being output by electronic devices. This content being output by the electronic device may comprise text, images, video, audio, or any other form of content. After identifying the supplemental content, the accessory devices may output this supplemental content in a variety of ways. For instance, the accessory devices may include a display or a projector to display supplement content that comprises text, images, or video. Additionally or alternatively, the accessory devices may include a speaker to play, audibly, supplemental content that comprises audio content.

In one example, one such accessory device comprises a reading light that is configured to physically couple to an eBook reader device for the purpose of illuminating a display of the eBook reader device. This light may, for instance, enable viewing of the display in low-light conditions. In addition, the reading light may include its own output device for outputting content, as described in detail below. The reading light then leverages this output device to output content that is supplementary or complementary to primary content that the eBook reader device displays, for the purpose of enhancing consumption of this primary content.

To identify the supplemental content, the accessory devices described below may store or have access to a supplementary-content module. After identifying the supplemental content, this module may cause output of the supplemental content on the display or other output device of the accessory device. For instance, the module may identify that a user is reading a particular article that is related to a sporting event. After making this determination, the supplementary-content module may identify supplementary content, such as scores from games that are related to the sporting event. The module may then output these sports scores, such as on an LED of the device. Therefore, this accessory device not only provides accessory functionality, such as a reading light to help the user read the article regarding the sporting event, but also enhances the consumption of this material by displaying scores of other related sporting events.

In some instances, the supplementary-content module identifies the content with reference to preferences of the user operating or associated with the eBook reader device. For instance, this user may set a preference indicating that the user prefers to view a particular type of sports score (e.g., soccer scores) when reading a sporting-related article. In still other instances, the user of the eBook reader device may actually provide the identification of the specific supplemental content to the accessory device, which may accordingly display or otherwise output this supplemental information. While some of the examples above describe an accessory device in the form of a reading light, any other type of accessory device may enhance a user experience in the same or a similar manner, as discussed in detail below.

FIG. 1 illustrates a perspective view 100 an example electronic device and two accessories, one or both of which may be configured to identify content being output by the electronic device and, in response, output supplemental content. Here, the electronic device comprises an electronic book (eBook) reader device 102, while the accessories comprise a reading light 104 and a cover 106. While FIG. 1 illustrates an eBook reader device, other environments implementing the described techniques may include a laptop computer, a multifunction communication device, a portable digital assistant (PDA), a wireless headset, an entertainment system, a portable media player, a tablet computer, a camera, a video camera, a netbook, a notebook, a desktop computer, a gaming console, a DVD player, a media center, or any other type of device. In addition, the techniques may apply to a variety of accessory devices, as discussed in detail below.

As illustrated, the reading light 104 couples to the eBook reader device 102 to enable viewing of a display 108 of the device 102 in low-light conditions. As such, the reading light 104 may include a light source 110, a connector 112 that joins the light source 110 to the cover 106, a display 114 to output supplemental content, and a mount 116 to couple the reading light 104 to the eBook reader device 102. In some instances, the mount couples the reading light 104 directly to the eBook reader device 102, to the device 102 via the cover 106, or in another manner. Further, the mount 116 may fixedly or detachably attach the reading light to the eBook reader device in certain instances. The cover 106, meanwhile, functions to cover and protect the display 108 of the eBook reader device 102, and may include a front cover panel, a spine, and a back cover panel.

The cover 106 may physically affix to the device 102 by a connection mechanism 118. The connection mechanism 118 may include such things as an adhesive, a hook-and-loop fastener, elastic straps, magnetism, clips, hooks, etc. The connection mechanism 118 is shown in this illustration on the spine. In other implementations, the connection mechanism 118 may be located, for example, on an inside surface of the back cover panel or other places on the cover 106. In some implementations, the cover 106 may be formed as a sleeve into which the device 102 is placed. In such implementations, the cover 106 may lack a discrete connection mechanism 118 because the cover 106 itself functions as the connection mechanism 118 by surrounding the device 102.

The mount 116 and/or the connection mechanism 118 may further facilitate an electrical connection as well as a physical connection. For example, the mount 116 and/or connection mechanism 118 may create a physical-electrical connection that carries electrical current for powering the reading light 104. In instances where the connection mechanism 118 of the cover 106 creates a physical-electrical connection, the reading light 104 may reside within the cover 106 and may receive power from the device 102 via the connection. This connection may also allow for data communication between the device 102 and the reading light 104 via the cover 106.

In one implementation where the reading light 104 resides within the cover 106, the connection mechanism 118 might not supply power to the cover 106. In this implementation, power for the reading light 104 may be provided by a battery embedded in the cover 106, via an external power source such as an external battery or power cord, or via a battery embedded within the reading light 104 itself.

In other instances, meanwhile, the reading light 104 may be integral with the device 102 or may comprise a standalone device that detachably couples to the eBook reader device 102. In these instances, the physical-electrical connection between the device 102 and the reading light 104 may provide for the light to both receive a charge from the device 102 and communicate data with the device 102.

Regardless of the power supply, in this example the reading light 104 is capable of identifying content that the eBook reader device 102 displays and, in response, to display supplemental content on the display 114 of the reading light 104. In the illustrated example, for instance, the eBook reader device 102 displays a business-related article describing the state of the U.S. stock market. As such, the reading light 104 displays a stock ticker indicating a current level of major U.S. stock market indices, such as the Dow Jones Industrial Average (DJI) and the NASDAQ Composite Index (IXIC). By displaying this content that is supplemental to the content that the device 102 displays, the reading light 104 enhances the user experience of the consumption of the article in addition to providing the functionality of lighting the display 108.

In some instances, the accessory, such as the reading light 104, identifies the supplemental content with reference to the primary content being output by the electronic device, such as the eBook reader device 102. For instance, in the illustrated example the reading light 104 may communicatively couple to the eBook reader device 102 for the purpose of identifying the content that the device 102 displays. The light 104 may communicatively couple with the device 102 wirelessly or via any of the physical interfaces and electrical connections described above. In the former instances, both the eBook reader device 102 and the reading light 104 may include a respective wireless communication interface for the purpose of communicating with the other device.

In both the wired and wireless instances, the reading light 104 may identify the content currently being output and may identify and display supplemental content to output, such as the stock ticker symbols. To do so, the content that eBook reader device 102 displays may provide the identification of the supplemental content, or the reading light 104 may instead make the initial identification. For instance, a module associated with the reading light 104 may parse the displayed business article to determine that the article mentions the Dow Jones Industrial Average and the NASDAQ Composite Index. In response, the reading light 104 may request and receive (e.g., via the wireless communication interface) the values of these indices.

In still other indices, a user operating or associated with the eBook reader device 102 may provide input in determining the supplemental content. For instance, the user may interact with the display 108 of the eBook reader device 102 or the display 114 of the reading light 104 for the purpose of identifying the supplemental content to display. For instance, in the illustrated example, the user may request that the reading light 114 display the illustrated stock ticker.

Conversely, the user may provide preferences into the eBook reader device 102, the reading light 104, or a user account that either of the devices 102 and 104 communicate with (e.g., an online user account associated with a content provider that provides the illustrated eBook(s)). In this example, the reading light 104 and/or the eBook reader device 102 may reference these user preferences in determining the supplemental content to display. For instance, the user may indicate that she prefers to view stock tickers when viewing business-related articles, certain types of sports scores when viewing sports-related articles, and the like.

While FIG. 1 illustrates a reading light 104 outputting the supplemental content, other detachable or integral accessory devices may output this content in other instances. For instance, the cover 106 may itself include a display for displaying the identified supplemental content. Further, the accessory device implementing these techniques may comprise any one or more of the following from the non-exhaustive list of accessory devices:

a projector to project content onto an electronic device, such as the eBook reader device 102;
a universal serial bus (USB) drive to receive a USB card;
a camera to receive images of an environment proximate to the electronic device;
a microphone to receive audio from the environment proximate to the electronic device;

an ambient light sensor to detect an amount of ambient light in the environment proximate to the electronic device;

an audio jack to receive a headphone or microphone connection;

a page-turn button to navigate the content output by the electronic device; or a biometric sensor to facilitate access to the electronic device via biometric credentials.

As shown above, the accessory device may comprise any type of accessory that provides functionality that complements operation of the electronic device rendering the primary content, such as the eBook reader device 102. In addition, the accessory device(s) may output the supplemental content in a variety of manners. For instance, the accessory device(s) may display the supplemental content on a separate display (as FIG. 1 illustrates), may include a projector to project the content, may include a speaker to output the content audibly, or may output the content in any other manner.

Figure 2:
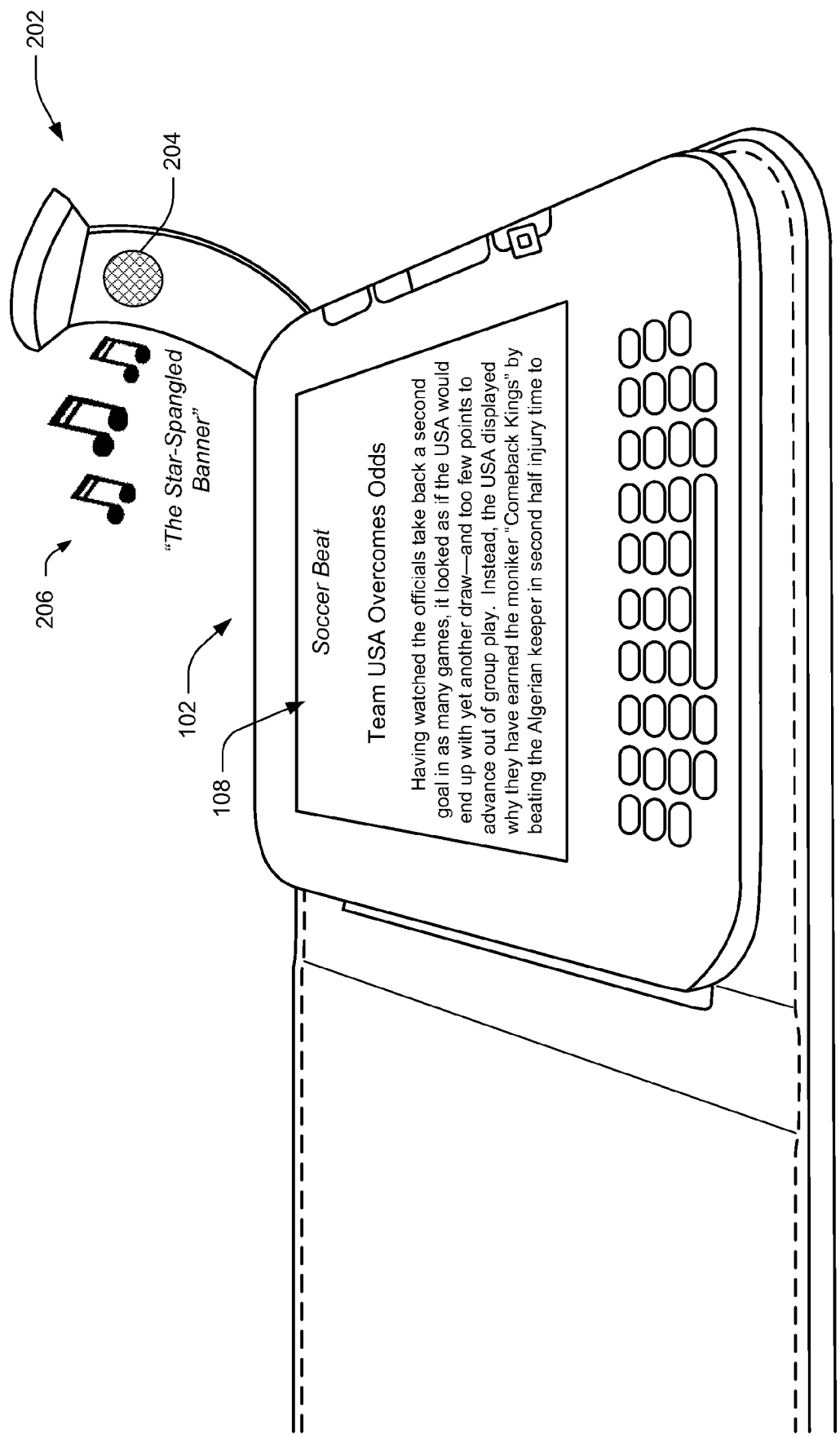
FIG. 2 shows another perspective view of the eBook reader device from FIG. 1, as well as a reading light that is configured to illuminate the display of the eBook reader device and output audio content that is supplemental to content that the eBook reader device displays.

FIG. 2, for instance, illustrates a reading light 202 that includes a speaker 204 for the purpose of outputting the supplemental content in the form a song 206. As illustrated, the eBook reader device 102 currently displays a sports-related article about the United States soccer team. The reading light 202, therefore, has identified content that is supplemental to the illustrated article. Here, the supplement content comprises the song 206 ("The Star-Spangled Banner"), which is the national anthem for the United States. Again, the reading light 202 may have identified this content with reference to the content being displayed by the eBook reader device 102, with reference to a user preference of a user operating the device, or after receiving an identification of or a request for the content from the user.

Figure 3:
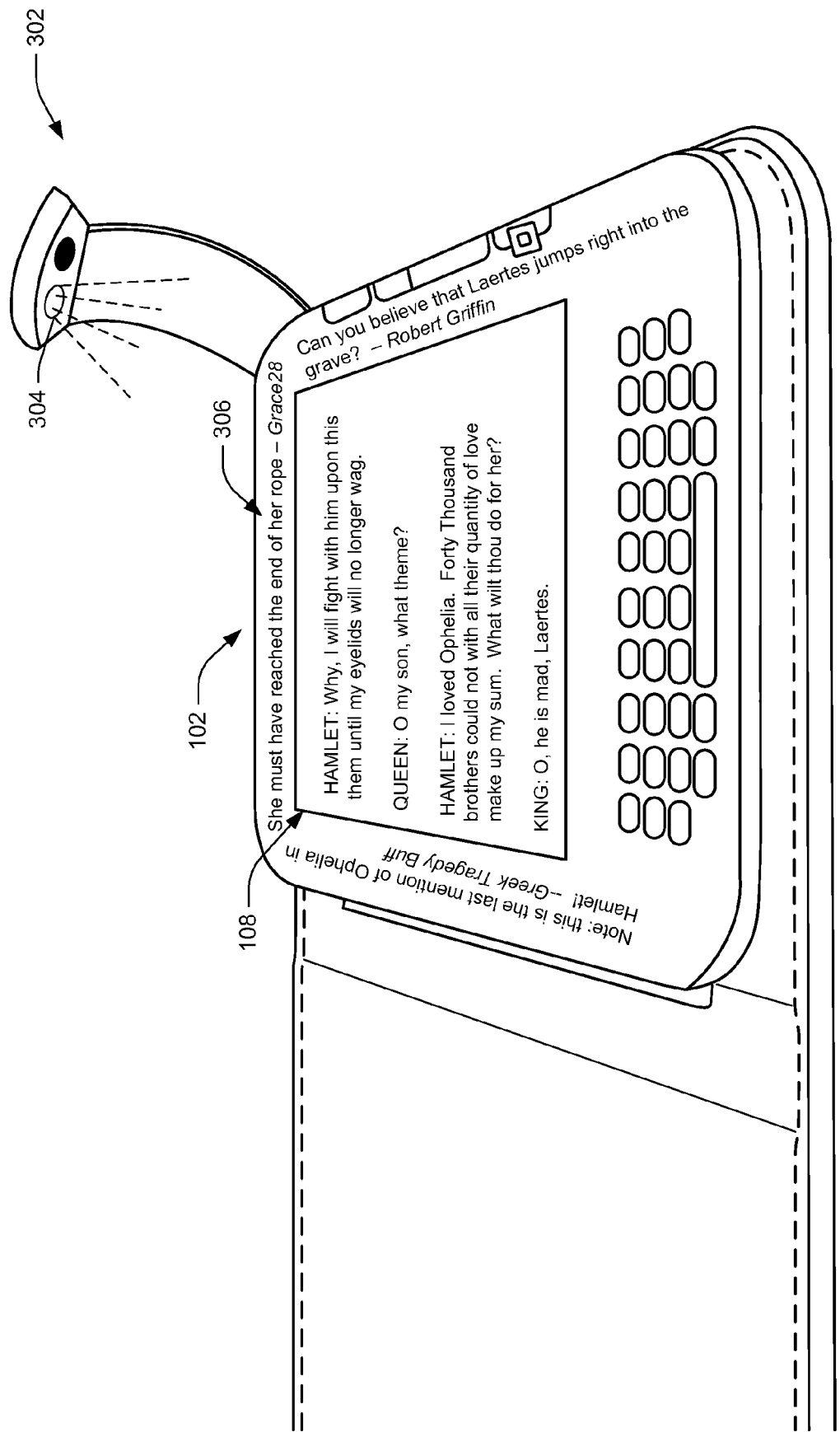
FIG. 3 shows another perspective view of the eBook reader device from FIG. 1, as well as an accessory that is configured to project content that is supplemental to content that the eBook reader device displays. This accessory may also perform another function that is complementary to operation of the eBook reader device, such as illuminate a display of the device or project primary content onto the device.

FIG. 3 shows another perspective view of the eBook reader device 102, as well as an accessory 302. Here, the accessory 302 includes a projector 304 and is configured to project content that is supplemental to content that the eBook reader device displays. This accessory may also perform another function that is complementary to operation of the eBook reader device, such as illuminate a display of the device or project primary content onto the device. That is, the accessory may comprise a reading light or a projector in this example, in addition to having the capability to project the supplemental content.

In this example, the display 108 of the eBook reader device 102 currently displays the play "Hamlet." Further, the accessory 302 projects content that is supplemental to the primary content of the device, such as one or more annotations 306 made by other readers of "Hamlet." That is, in this example the accessory 302 communicates with the eBook reader device 102 to identify a location of the play that the display 108 currently illustrates. After identifying the location, the accessory 302 locates annotations 306 that other users have previously made regarding the displayed location. For instance, the accessory 302 may communicate wirelessly with a content provider that stores annotations in association with eBooks for the purpose of requesting and displaying annotations at the appropriate locations. In other instances, the device 102 may communicate with the content provider to make this request and may then provide the annotations to the accessory 302.

In either instance, a user of the eBook reader device 102 is able to view other readers' thoughts about the play "Hamlet" at corresponding portions of the play. Further, the user of the eBook reader device 102 may request to store one of the projected annotations in her file or local storage of annotations. To do so, the user may make the request via a user interface presented by the eBook reader device 102, which may in turn communicate the request to the accessory 302 for providing the annotation to storage of the device 102. As such, the eBook reader device 102 and the accessory 302 may communicate bi-directionally with one another. Further, while FIG. 3 illustrates the accessory 302 projecting the supplemental content onto a bezel of the device, the accessory 302 may project or otherwise display the content on a side, back, or any other surface of the device in other implementations. Furthermore, the accessory 302 may additionally or alternatively project the content onto a cover for the eBook reader device 102, onto a wall or table, or onto any other surface in some implementations.

Figure 4:
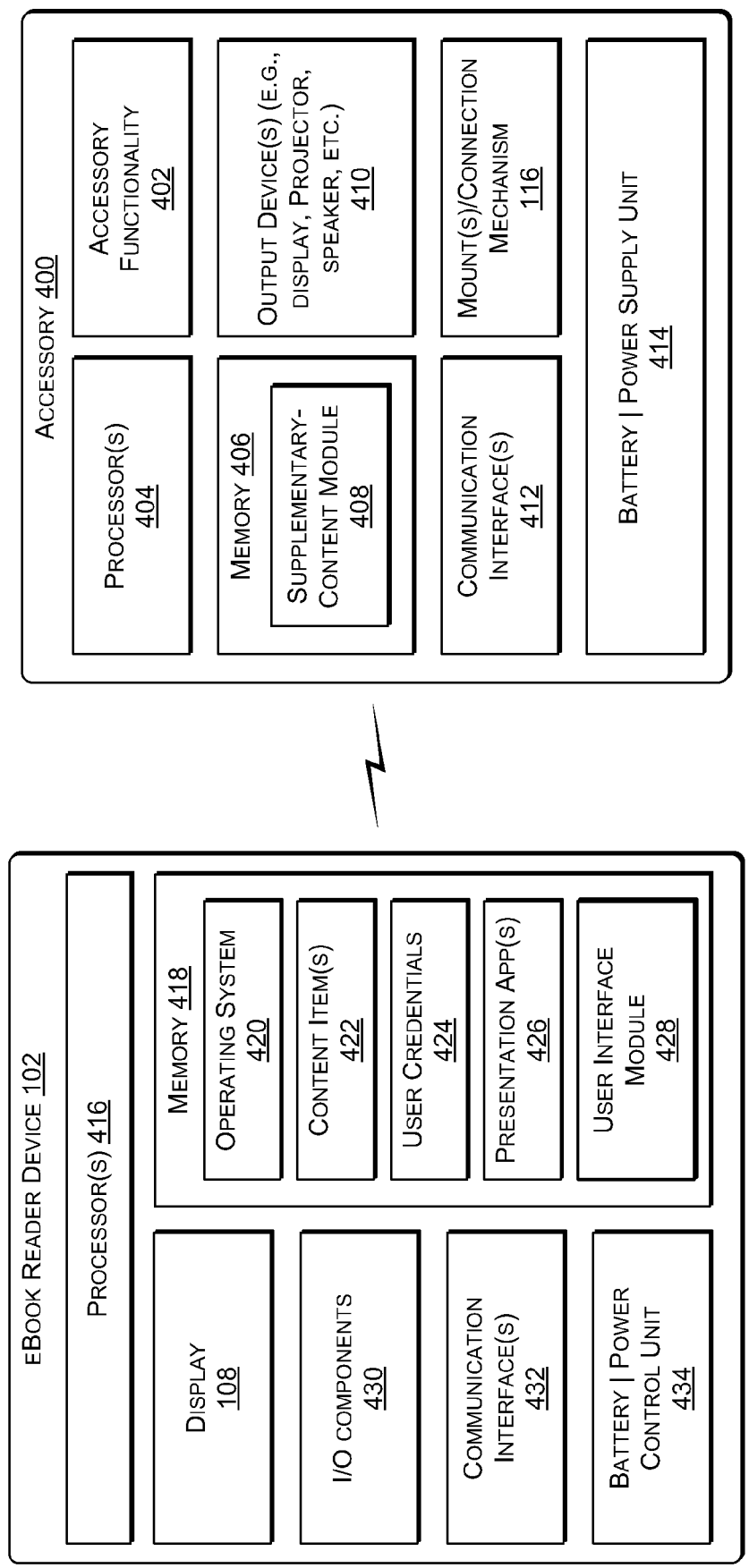
FIG. 4 is a block diagram showing components that may be implemented in subsystems of an electronic device and an accessory device, such as the eBook reader device and the reading light of FIG. 1.

FIG. 4 illustrates illustrative components that the eBook reader device 102 and an example accessory 400 may include in implementations described herein. The accessory 400 may comprise any of the accessories described above or any other accessory, such as a reading light, a cover, a projector, or the like. As illustrated, the accessory 400 may include accessory functionality 402 that comprises functionality to complement operation of an electronic device, such as the example eBook reader device 102. For instance, the accessory functionality 402 may comprise a reading light to illuminate a display of an electronic device, a projector to project content onto the electronic device, a USB drive to receive a USB card, portions of a cover to protect a display of the electronic device, or any other functionality that complements the operation of the device.

In addition, the accessory may comprise one or more processors 404, as well as memory 406 storing a supplementary-content module 408. The memory 406 is an example of computer storage media and may include volatile and nonvolatile memory. Thus, the memory 406 may include, but is not limited to, RAM, ROM, EEPROM, flash memory, or other memory technology.

The supplementary-content module 408 executes on the processors 404 to identify content that is supplemental to content being output by a corresponding electronic device. The module 408 then causes output of this supplemental content on one or more output devices 410 of the accessory 400. These output devices 410 may comprise a display (e.g., an LCD display, an LED, an electrophoretic display, or the like), a projector, a speaker, or any other device capable of outputting content.

The accessory 400 may further include one or more communication interfaces 412, such as a physical communication interface and/or a wireless communication interface for communicating with the electronic device and/or other devices or networks. For instance, the accessory 400 may utilize a physical communication interface that includes an electrical connection for identifying the content being output by an electronic device for the purpose of identifying supplemental content. In some instances, one or more mounts or another connection mechanism may provide this physical-electrical connection, as in the example of FIG. 1. For instance, the mount 116 and/or the connection mechanism 118 of FIG. 1 may provide this physical-electrical connection Finally, the accessory 400 may include a battery/power supply unit 414 for powering the accessory 400. In some instances, the accessory 400 may instead receive power via a power supply of the device to which the accessory couples.

The electronic device, such as the eBook reader device 102, may include the electronic display 108 to display electronic documents, such as electronic books or "eBooks". The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages etc. Accordingly, the terms book and/or eBook may include any visual content that is in electronic or digital form.

In a very basic configuration, the device 102 includes one or more processors 416 and memory 418. Like the memory 406, the memory 418 is an example of computer storage media and may include volatile and nonvolatile memory. Thus, the memory 418 may include, but is not limited to, RAM, ROM, EEPROM, flash memory, or other memory technology, or any other medium which can be used to store media items or applications and data which can be accessed by the device 102.

The memory 418 may be used to store any number of functional components that are executable on the one or more processors 416, as well as data that the device 102 outputs. For example, the memory 418 may store an operating system 420 and one or more content items 422, such as eBooks. The memory 418 may further include a memory portion designated as an immediate page memory to temporarily store one or more pages of an eBook. The pages held by the immediate page memory are placed therein a short period before a next page request is expected.

The term "page," as used herein, refers to a collection of content that is presented at one time in the display 108 of the eBook reader device 102. Thus, a "page" may be understood as a virtual frame of the content, or a visual display window presenting the content to the user. Thus, "pages" as described herein are not fixed permanently, in contrast to the pages of published "hard" books. Instead, pages described herein may be redefined or repaginated when, for example, the user chooses a different font for displaying the content in the first display. In addition to pages, the terms "page views", "screen views", and the like are also intended to mean a virtual frame of content.

The memory may also store user credentials 424, such as a username and password of a user, biometric data of a user, and the like. Thus, the user credentials 424 may be matched against received credentials for the purpose of granting a user access to the device 102 when the credentials match one another. In some instances, the accessory 400 may comprise a biometric sensor for receiving biometric data of the user, which may be stored as the user credentials 424.

In addition, the memory 418 may store one or more content presentations applications 426 that render content on the device 102. These applications may comprise media player(s) that render the content items 422 visually, audibly, or in any other manner. The memory 418 may also store a user interface module 428 that facilitates user operation of the device 102. The user interface module 428 may provide menus and other navigational tools to facilitate selection and rendering of the content items 422. The user interface module 428 may further include a browser or other application that facilitates access to sites over a network, such as websites or online merchants.

The device 102 further includes one or more displays 108. In one implementation, the display uses ePaper display technology, which is bi-stable, meaning that it is capable of holding text or other rendered images even when very little or no power is supplied to the display. The electronic display 108 may also be a reflective display without a backlight that is illuminated by ambient light sources external to the display. Some illustrative displays that may be used with the implementations described herein include bi-stable LCDs, MEMS, cholesteric, pigmented electrophoretic, and others. The display 108 may be embodied using other technologies, such as LCDs, LEDs, and OLEDs. In some implementations, the display 108 may further include a touch screen interface. For instance, the display 108 may comprise a touch-sensitive display or "touch-screen." In still other instances, the display 108 of the device 102 may comprise a projector that projects content onto any sort of display medium.

The device 102 may further include various input/output (I/O) components 430. Such components may include various user interface controls (e.g., buttons, joystick, keyboard, etc.), audio speaker, connection ports, and so forth. In addition, the eBook reader device 102 may couple to detachable I/O components, such as a wired or wireless headset, in some instances. In these instances, the detachable I/O components may also allow a user to operate the device 102. For instance, the device 102 may include software to interpret signals from a traditional "hands-free" device as a request to turn a page. That is, the user may plug the headset into the device 102 (e.g., via an audio jack, wirelessly, etc.) and may use a call mute button, a call accept button, a call reject button, or any other button on the headset to turn a page of the rendered eBook. In another example, the user could plug audio headphones into the device 102 (e.g., via the audio jack, wirelessly, etc.) and may use controls traditionally used to turn up or down a volume of a music player to instead turn a page of the rendered eBook.

The device 102 may also include one or more communication interfaces 432 to facilitate communication with external, remote computing sources over various networks, or with other local devices. For instance, these one or more communication interfaces 432 may include a physical or wireless interface to communication with the accessory 400, as discussed above.

Further, these interface(s) may facilitate the transfer of content (e.g., eBooks, magazines, audio books, etc.), as well as program modules, to the device 102. Each communication interface(s) described herein may support both wired and wireless connection to various networks, such as cellular networks, radio, WiFi networks, short range networks (e.g., Bluetooth), IR, and so forth.

Finally, the device 102 may also include a battery/power control unit 434. The battery/power control unit 434 operatively controls an amount of power, or electrical energy, consumed by the device 102. Actively controlling the amount of power consumed by the device 102 may achieve more efficient use of electrical energy stored by the battery.

The eBook reader device 102 may have additional features or functionality. For example, the eBook reader device 102 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Figure 5:
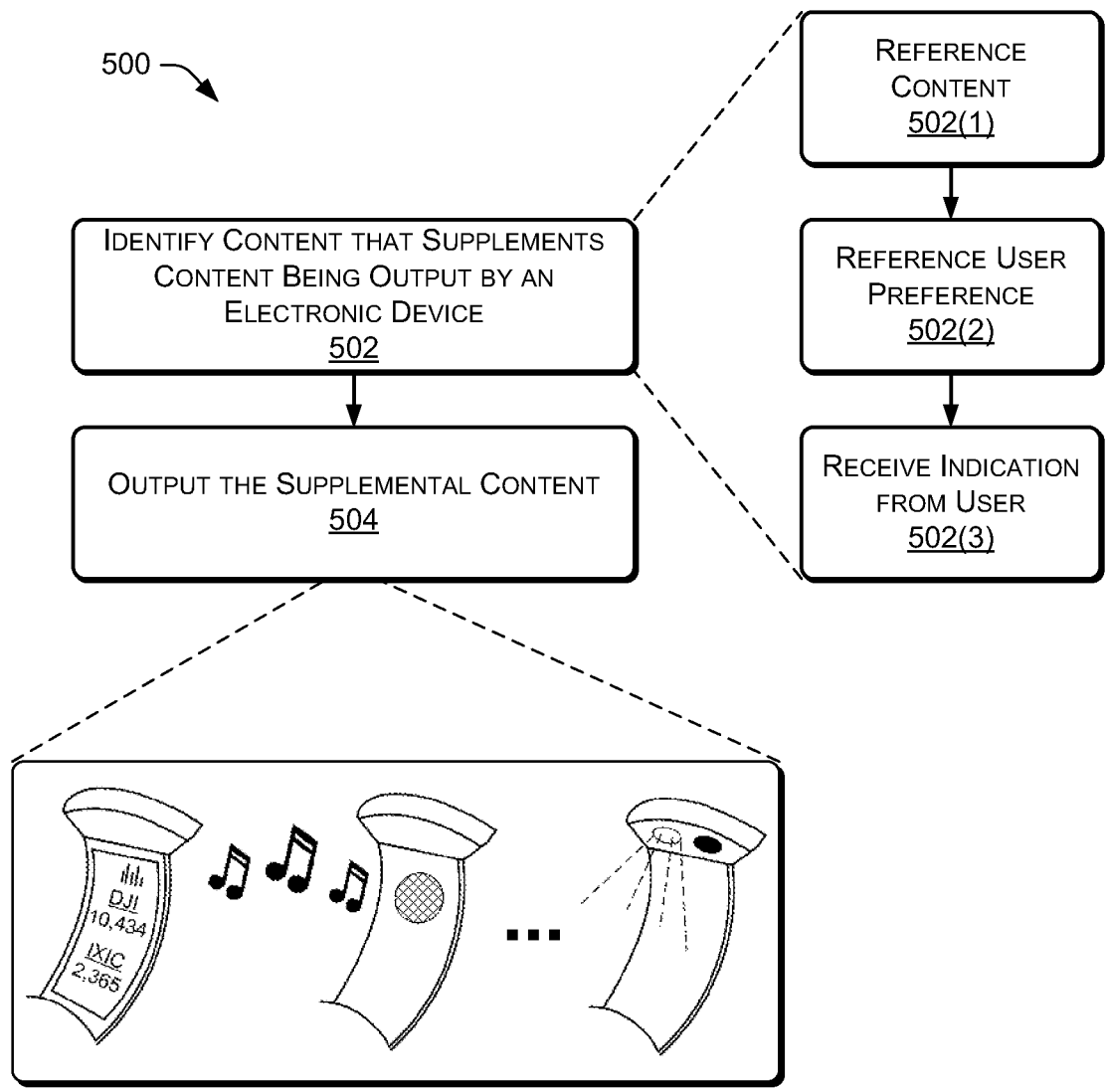
FIG. 5 is an example process of an accessory identifying and outputting content that is supplemental to content being output by an electronic device.

FIG. 5 is an example process 500 of an accessory identifying and outputting content that is supplemental to content being output by an electronic device. This process is illustrated as a collection of blocks in a logical flow graph, which represent a sequence of operations that can be implemented in hardware, software, or a combination thereof. In the context of software, the blocks represent computer-executable instructions that may be stored on one or more computer-readable storage media and that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

At 502, the accessory device identifies content that is supplemental to content that is being output by an electronic device. In some instance, this electronic device may comprise a device to which the accessory couples. For instance, the accessory device may comprise a reading light or other accessory described above, which couples to an eBook reader device, a mobile telephone, a tablet computing device, or any other electronic device.

Identifying the supplemental content at 502 may comprise one or more sub-operations. For instance, at 502(1), the accessory may reference the content being displayed by the electronic device ("the primary content") before selecting or otherwise identifying the supplemental content. As described above, the accessory could, for example, determine that the device is currently displaying a sports-related article and, in response, the accessory may identify related sports scores.

Additionally or alternatively, the accessory may reference a preference of a user operating or associated with the electronic device at 502(2). Finally, the accessory may instead or in addition receive an indication of the identified supplemental content from the user operating the device at 502(3). In these latter instances, the user herself selects the supplemental content for output.

At 504, the accessory device outputs the identified supplemental content. For instance, the accessory may cause display of the supplemental content on a display of the accessory, may project the content onto the accessory, the electronic device, or another medium, may output the supplemental content audibly on a speaker of the accessory, or may output the supplemental content in any other manner. By doing so, the accessory device enhances consumption of the primary content that the eBook reader device 102 outputs.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An accessory device configured to couple to an electronic book reader device, the accessory device comprising:
a reading light to illuminate a display of the electronic book reader device when the accessory device couples to the electronic book reader device and when the reading light is powered on;
a display to render supplementary content that has been designated as supplementary to content rendered on the display of the electronic book reader device; and
a supplementary-content module, stored in a memory and executable on one or more processors to identify the supplementary content based at least in part on a communication with the electronic book reader device and to cause display of the supplementary content on the display of the accessory device.

2. The accessory device of claim 1, wherein the display of the electronic book reader device comprises a bi-stable, reflective, un-backlit display.

3. The accessory device of claim 1, wherein the supplementary-content module is further executable on the one or more processors to identify the supplementary content by referencing the content being rendered on the display of the electronic book reader device.

4. The accessory device of claim 1, wherein the supplementary-content module is further executable on the one or more processors to identify the supplementary content by referencing a user preference of a user operating or associated with the electronic book reader device.

5. The accessory device of claim 1, wherein the supplementary-content module is further executable on the one or more processors to identify the supplementary content by receiving an identification of the supplementary content from a user operating the electronic book reader device.

6. The accessory device of claim 1, further comprising:
a wireless communication interface for communicating with the electronic book reader device; and
wherein the coupling of the accessory device to the electronic book reader device is free from a physical-electrical connection, and the supplementary-content module is further executable on the one or more processors to identify the supplementary content by referencing the content being rendered on the display of the electronic book reader device via the wireless communication interface.

7. The accessory device of claim 1, further comprising:
a physical communication interface for communicating with the electronic book reader device; and
wherein the coupling of the accessory device to the electronic book reader device includes a physical-electrical connection, and the supplementary-content module is further executable on the one or more processors to identify the supplementary content by referencing the content being rendered on the display of the electronic book reader device via the physical communication interface.

8. The accessory device of claim 1, wherein the accessory device is integral with or detachable from the electronic book reader device.

9. An accessory device configured to detachably couple to an electronic device, the accessory device comprising:
one or more processors;
memory;
accessory functionality configured to complement operation of the electronic device;
a supplementary-content module, stored in the memory and executable on the one or more processors to determine content output by the electronic device, identify supplementary content that has been designated as supplementary to the content output by the electronic device, and cause output of the supplementary content.

10. An accessory device as recited in claim 9, wherein the accessory functionality of the accessory device complements the operation of the electronic device in a manner other than outputting content.

11. An accessory device as recited in claim 9, wherein the electronic device comprises a display to output the content, and wherein the accessory functionality comprises a reading light configured to illuminate the display of the electronic device when the accessory device couples to the electronic device and when the reading light is powered on.

12. An accessory device as recited in claim 9, wherein the electronic device comprises a display to output the content, and wherein the accessory functionality comprises a cover that is configured to cover and protect the display of the electronic device.

13. An accessory device as recited in claim 9, wherein the accessory functionality comprises:
- a projector to project content onto the electronic device;
- a universal serial bus (USB) drive to receive a USB card;
- a camera to receive images of an environment proximate to the electronic device;
- a microphone to receive audio from the environment proximate to the electronic device;
- an ambient light sensor to detect an amount of ambient light in the environment proximate to the electronic device;
- an audio jack to receive a headphone or microphone connection;
- a speaker to output audio;
- a page-turn button to navigate the content output by the electronic device; or
- a biometric sensor to facilitate access to the electronic device via biometric credentials.

14. An accessory device as recited in claim 9, further comprising a display on which to output the supplementary content.

15. An accessory device as recited in claim 14, wherein the display of the accessory device comprises a liquid crystal display (LCD), a light-emitting diode (LED) display, or an electrophoretic display.

16. An accessory device as recited in claim 9, further comprising a projector with which to output the supplementary content.

17. An accessory device as recited in claim 9, wherein the supplementary-content module causes display of the supplementary content on: (1) a portion of the accessory device, or (2) a portion of the electronic device other than a powered display of the electronic device.

18. An accessory device as recited in claim 17, wherein the supplementary-content module causes display of the supplementary content on the portion of the electronic device other than a powered display of the electronic device, and wherein the portion of the electronic device comprises a bezel, side, or back of the electronic device.

19. An accessory device as recited in claim 9, wherein the supplementary content comprises audio content, and further comprising a speaker to output the audio content.

20. An accessory device as recited in claim 9, further comprising a mount to facilitate coupling of the accessory device to the electronic device.

21. An accessory device as recited in claim 9, further comprising a wireless communication interface to communicate with the electronic device and to facilitate the identification, by the supplementary-content module, of the supplementary content.

22. A method comprising:
- under control of one or more computer systems configured with specific executable instructions,
- identifying, by an accessory device, based at least in part on an electronic communication, content that supplements content being output by an electronic device, the accessory device being configured to detachably mount to the electronic device to perform a complementary function for the electronic device; and
- outputting the supplemental content by the accessory device to enhance consumption of the content being output by the electronic device.

23. A method as recited in claim 22, wherein:
the electronic device comprises a display for outputting the content;
the accessory device comprises a reading light and the complementary function comprise illuminating the display of the electronic device; and
the accessory device comprises: (1) a display or projector to display the supplemental content, or (2) a speaker to output the supplemental content.

24. A method as recited in claim 22, further comprising:
identifying, by the accessory device, the content being output by the electronic device prior to the identifying of the supplemental content; and
wherein the identifying of the supplemental content comprises referencing the identified content being output by the electronic device.

25. A method as recited in claim 22, further comprising:
determining, by the accessory device, a user preference of a user operating or associated with the electronic device prior to the identifying of the supplemental content; and
wherein the identifying of the supplemental content comprises referencing the determined user preference.

26. A method as recited in claim 22, further comprising:
receiving, by the accessory device, an identification of the supplemental content from a user operating the electronic device; and
wherein the identifying of the supplemental content comprises referencing the identification received from the user.

27. One or more computer-readable media storing the specific executable instructions that, when executed, cause the one or more computing systems to perform a method as recited in claim 22.

* * * * *